United States Patent [19]
Yoshino

[11] Patent Number: 6,055,476
[45] Date of Patent: Apr. 25, 2000

[54] ENGINE TORQUE CONTROL SYSTEM

[75] Inventor: Takahiro Yoshino, Yokohama, Japan

[73] Assignee: Nissan Motor Co., Ltd., Yokohama, Japan

[21] Appl. No.: 09/203,675

[22] Filed: Dec. 1, 1998

[30] Foreign Application Priority Data

Dec. 17, 1997 [JP] Japan ..................................... 9-348042

[51] Int. Cl.$^7$ ............................. F02D 11/10; F02D 41/14
[52] U.S. Cl. ...................... 701/110; 123/339.16; 123/350
[58] Field of Search ....................... 701/110; 123/339.16, 123/350

[56] References Cited

U.S. PATENT DOCUMENTS

| 5,078,109 | 1/1992 | Yoshida et al. ........................... 123/350 |
| 5,931,138 | 8/1999 | Uchida ..................................... 123/436 |

FOREIGN PATENT DOCUMENTS 62-110536  5/1987  Japan .
9-287513  11/1997  Japan .

*Primary Examiner*—Andrew M. Dolinar
*Attorney, Agent, or Firm*—Foley & Lardner

[57] ABSTRACT

An engine torque control system controls an intake air quantity with a throttle valve and a fuel supply quantity with a fuel injector so as to obtain a target engine torque and a target air fuel ratio in accordance with engine operating conditions. The torque control system comprises a first section for calculating a target equivalent ratio, a second section for calculating a unit demand throttle opening area which is a demand throttle opening area per unit displacement for one engine revolution, in accordance with the accelerator opening degree and the engine speed, a third section for calculating a target base intake air quantity from the unit demand throttle opening area, a fourth section for calculating a target control intake air quantity from the target base intake air quantity and the target equivalent ratio, a fifth section for calculating a desired target throttle opening degree from the target control intake air quantity and the engine speed, and a sixth section for controlling the actual throttle opening degree of the throttle valve to the target throttle opening degree.

22 Claims, 16 Drawing Sheets

{ AIR FUEL RATIO  CONSTANT
ACC OPENING    10 deg

THROTTLE VALVE OPENING DEGREE [deg]

ENGINE SPEED NE [rpm]

{ AIR FUEL RATIO  CONSTANT
ACC OPENING    40 deg

THROTTLE VALVE OPENING DEGREE [deg]

ENGINE SPEED NE [rpm]

6,055,476

ENGINE TORQUE CONTROL SYSTEM

BACKGROUND OF THE INVENTION

The present invention relates to an engine torque control system or method, and more specifically to a system or method using an electronically controlled throttle valve.

A Japanese Patent Kokai Publication No. 62(1987)-110536 shows a conventional engine torque control system.

SUMMARY OF THE INVENTION

In the conventional engine torque control system, a target throttle valve opening degree is determined from a target engine torque and an engine speed (rpm) by a search through a map (or table lookup), and the map is based on the theoretical air fuel ratio. Therefore, this system is inadequate for an engine of a type controlling the air fuel ratio in accordance with one or more engine operating conditions. In order to vary the air fuel ratio while holding the engine speed and torque unchanged, the control system is required to vary both the throttle opening degree and the fuel supply quantity, as shown in FIG. 13. In order to make the air fuel ratio leaner than the theoretical level, the control system is required to increase the intake air quantity and at the same time to decrease the fuel supply quantity. The conventional system is unable to meet such a requirement.

FIG. 14 shows an engine torque control system similar to systems proposed in a Japanese Patent Application No. 9-38773, and a U.S. patent application Ser. No. 08/804,454, now U.S. Pat. No. 5,931,128. The control system of FIG. 14 first calculates a target base torque (that is, a target engine torque at the theoretical air fuel ratio) from the accelerator opening and the engine speed, then calculates a target base intake air quantity (a target intake air quantity at the theoretical air fuel ratio) from the target base torque and the engine speed, further calculates a target intake air quantity by dividing the target base intake air quantity by a target equivalent ratio (or target fuel/air ratio) DML, further calculates a target throttle opening area from the target intake air quantity and the engine speed, finally calculates a target throttle opening degree from the target intake air quantity, and controls the actual throttle opening degree toward the target throttle opening degree electronically.

In the control system of FIG. 14, however, it is not easy to prepare an adequate map of the target throttle opening area (for determining a value of the target throttle opening area corresponding to a value of the target intake air quantity) because of a characteristic shown in FIG. 15. The intake air quantity increases as the throttle opening area increases as shown in FIG. 15. However, as the pressure difference between the upstream side and the downstream side of the throttle valve decreases, the intake air quantity enters a saturation region and becomes slow to increase. As viewed from the throttle valve opening, on the other hand, the throttle valve opening area rises steeply when the intake air quantity becomes equal to or greater than a predetermined level. The level of the intake air quantity at which the throttle valve opening area starts a steep rise differs widely in dependence on the engine speed. Because of the flow characteristic of the throttle valve as shown in FIG. 15, it is not easy to properly arrange lattice points on the axis of the intake air quantity in the map of the target throttle opening area. In the high load region (shown by the saturation region in FIG. 15), the accuracy in control of the throttle valve opening degree is low if the grid interval between adjacent lattice points is wide. With the low control accuracy, the throttle valve could not open fully in response to a request for full throttle, or might fully open improperly without a request for full throttle.

An increase in the total number of lattice points is disadvantage in the view of the memory capacity. If the grid interval is narrowed by increasing the number of lattice points in the high load region without increasing the total number of the lattice points, then the number of lattice points is decreased and the grid interval is increased in the low load region where the intake air quantity is small. This results in a decrease in the control accuracy of the throttle valve opening in the low load region.

Moreover, the system of FIG. 14 uses the map for determining the target throttle opening area and the map for determining the target base torque from the accelerator opening degree in combination to determine the target throttle opening degree. Therefore, the resulting target throttle opening degree is liable to suffer errors in the lookup procedures of both maps synergistically.

In the characteristic of the throttle opening degree with respect to the accelerator opening degree under the conditions of constant air fuel ratio and constant engine speed, moreover, the system of FIG. 14 has a nonlinear portion as shown by a solid line in FIG. 11, deviating from an ideal linearity shown by a broken line.

FIGS. 12A and 12B show characteristics obtained by acceleration with the accelerator opening being held constant at a constant air fuel ratio. As shown by solid lines, the system of FIG. 14 is unable to hold the throttle valve opening degree constant even at the lattice points of the engine speed. The throttle valve opening degree tends to vary widely in regions off the lattice points.

It is an object of the present invention to improve the control accuracy of the throttle valve opening.

According to the present invention, a torque controlling apparatus comprises:

i) a first section for calculating a target equivalent ratio, ii) a second section for calculating a unit demand throttle opening area which is a demand throttle opening area per unit displacement for one engine revolution, in accordance with the accelerator opening degree and the engine speed, iii) a third section for calculating a target base intake air quantity in accordance with the unit demand throttle opening area, iv) a fourth section for calculating a target control intake air quantity in accordance with the target base intake air quantity and the target equivalent ratio, v) a fifth section for calculating a desired target throttle opening degree in accordance with the target control intake air quantity and the engine speed, and vi) a sixth section for controlling an actual throttle opening degree of the throttle valve to the target throttle opening degree.

DETAILED DESCRIPTION OF THE INVENTION

Figure 1:
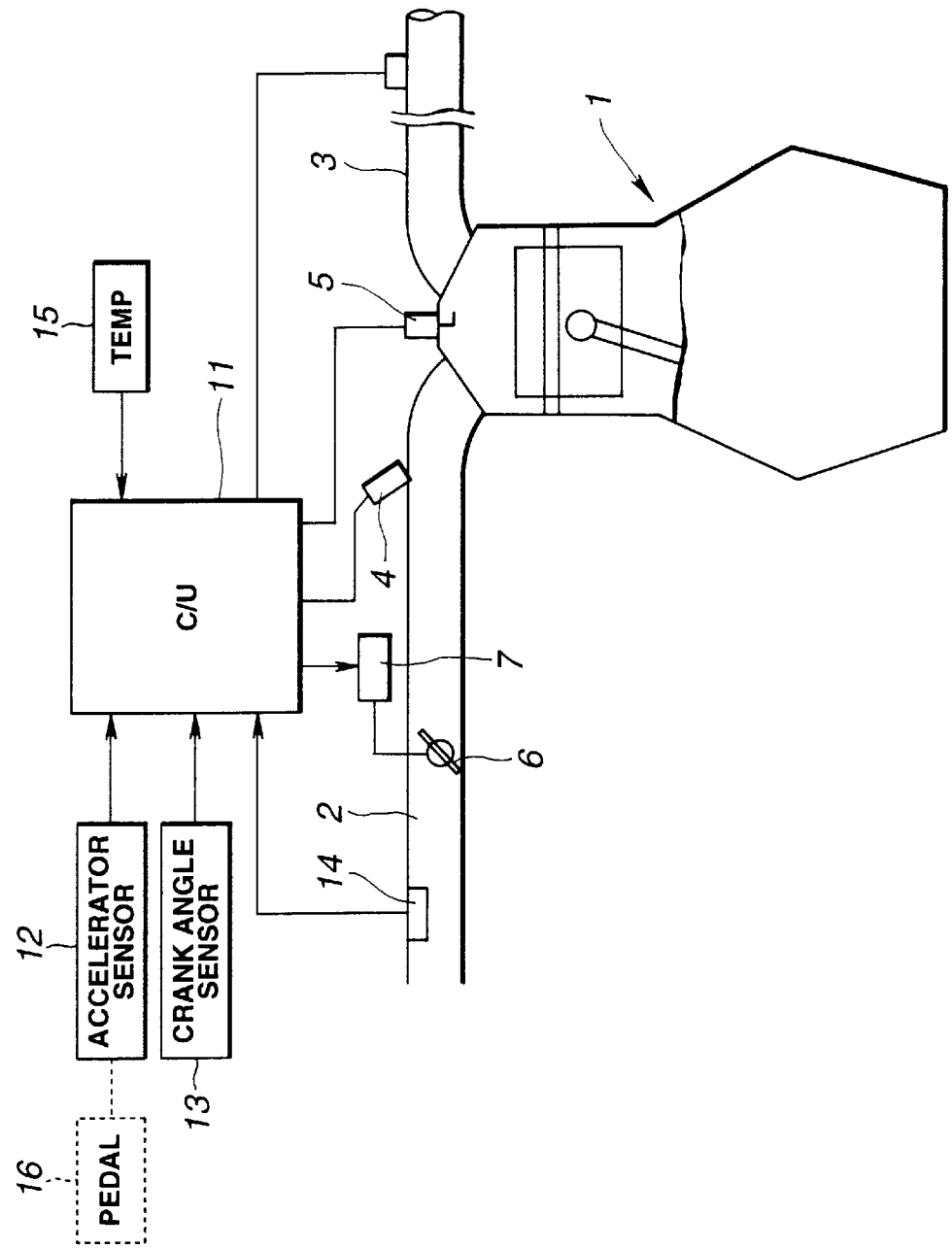
FIG. 1 is a schematic view of an engine control system according to one embodiment of the present invention.

An engine system shown in FIG. 1 according to one embodiment of the present invention comprises an engine proper 1, an intake passage 2, an exhaust passage 3, a fuel injector 4, a spark plug 5, a throttle valve 6, and a throttle actuating unit 7 for electronically controlling the opening of the throttle valve 6. For example, the fuel injector 4 may be a port injection type for injecting fuel into an intake port as shown in FIG. 1, or an in-cylinder direct injection type for injecting fuel directly into a combustion chamber.

In this example, there is no bypass passage bypassing the throttle valve 6. When an air conditioning compressor is turned on during idling, and hence an required amount of auxiliary air is increased, an engine control unit 11 increases the opening degree of the throttle valve 6 by an amount corresponding to the required auxiliary air amount.

An accelerator opening sensor (or accelerator position sensor) 12 senses an accelerator opening degree (or an accelerator depression degree) of an accelerator pedal 16. The accelerator opening degree corresponds to an engine load.

A crank angle sensor 13 of this example produces a position signal for every unit crank angle, and reference signal signaling each cylinder stroke phase difference. The control system can sense the engine speed by measuring the number of pulses per unit time of the position signal, or measuring the period of occurrence of pulses of the reference signal.

An air flow meter (or air flow sensor) 14 senses an intake air flow rate.

A temperature sensor 15 senses the temperature of a engine cooling water.

The control unit 11 obtains input information on engine operating conditions by receiving signals from these sensors, and controls the fuel injection with the fuel injector 4, and the opening degree of the throttle valve 9 with the throttle actuating unit 10.

In the case of the direct fuel injection, the engine system according to this example employs a stratified charge combustion mode in a low load region, and a homogeneous charge combustion mode in a high load region. In the stratified combustion mode, the fuel is injected at the later stage of the compression stroke so that a combustible air fuel mixture is produced in a cavity near the spark plug 5 just before the top dead center of the compression stroke, and the spark plug 5 initiates a stratified charge combustion at a ultra lean air fuel ratio above 40 as a whole. In the homogeneous mode, the fuel is injected on the intake stroke to promote the mixture of air and fuel and to fill the entire chamber with the homogenous air fuel mixture, and the homogeneous combustion is achieved near the theoretical air fuel ratio. In a medium load region between the region for the stratified mode and the region for the homogeneous mode, lean combustion is performed at an air fuel ratio richer than the level of the stratified mode and leaner than the level of the homogeneous mode.

In this example, therefore, there are three control regions significantly differing in the air fuel ratio. In a changeover among these combustion modes, the control system changes the air fuel ratio by changing both the throttle opening degree and the fuel injection quantity while holding the engine speed and the engine torque unchanged.

Figure 14:
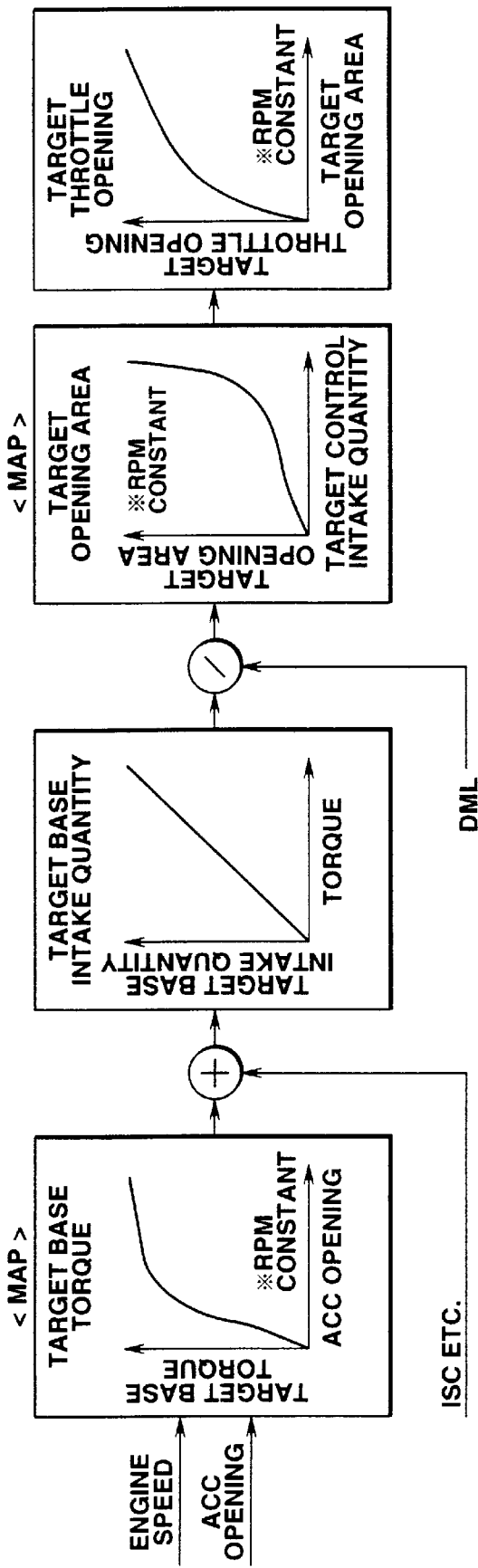
FIG. 14 is a block diagram of a throttle control system similar to the systems proposed in the Japanese Patent Application No. 9-38773, and the U.S. patent application Ser. No. 08/804,454.

The control system of FIG. 14 can change the air fuel ratio in a similar manner. However, the accuracy of the throttle control tends to be low as mentioned before.

Figure 2:
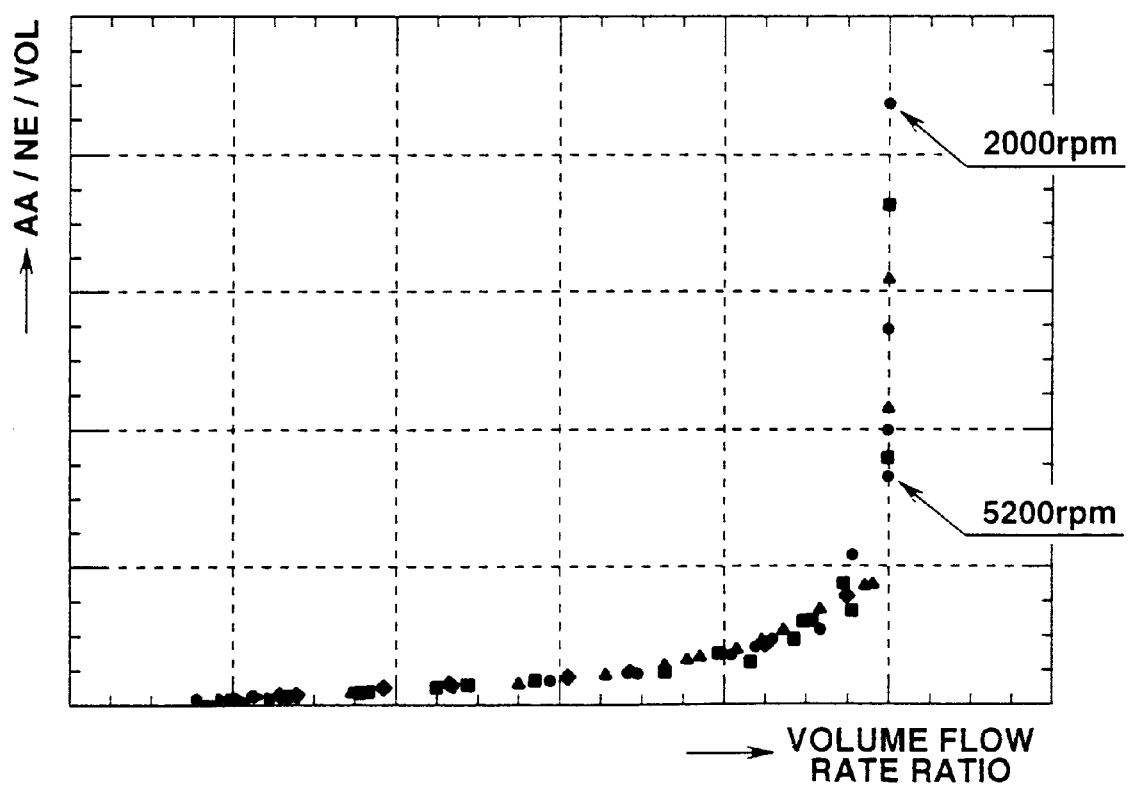
FIG. 2 is a graph showing a relationship between a volumetric flow rate ratio and a per-unit-displacement throttle opening area (AA/NE/VOL), used in the engine control system of FIG. 1.

In the embodiment of the present invention, particular notice is taken of a characteristic relationship shown in FIG. 2 between a volume flow rate ratio and a unit (or per-unit-displacement) throttle opening area. The volume flow rate ratio is a quotient obtained by dividing the intake air quantity at an engine speed by a maximum intake air quantity at that engine speed. The unit throttle opening area (AA/NE/VOL) is a throttle opening area per unit displacement, per one engine revolution. This relationship between the volume flow rate ratio and the unit throttle opening area is substantially unchanged by the engine speed. The control system of FIG. 1 calculates the target intake air quantity and target throttle opening area by using this characteristic relationship which is substantially free from the influence of the engine speed.

Figure 15:
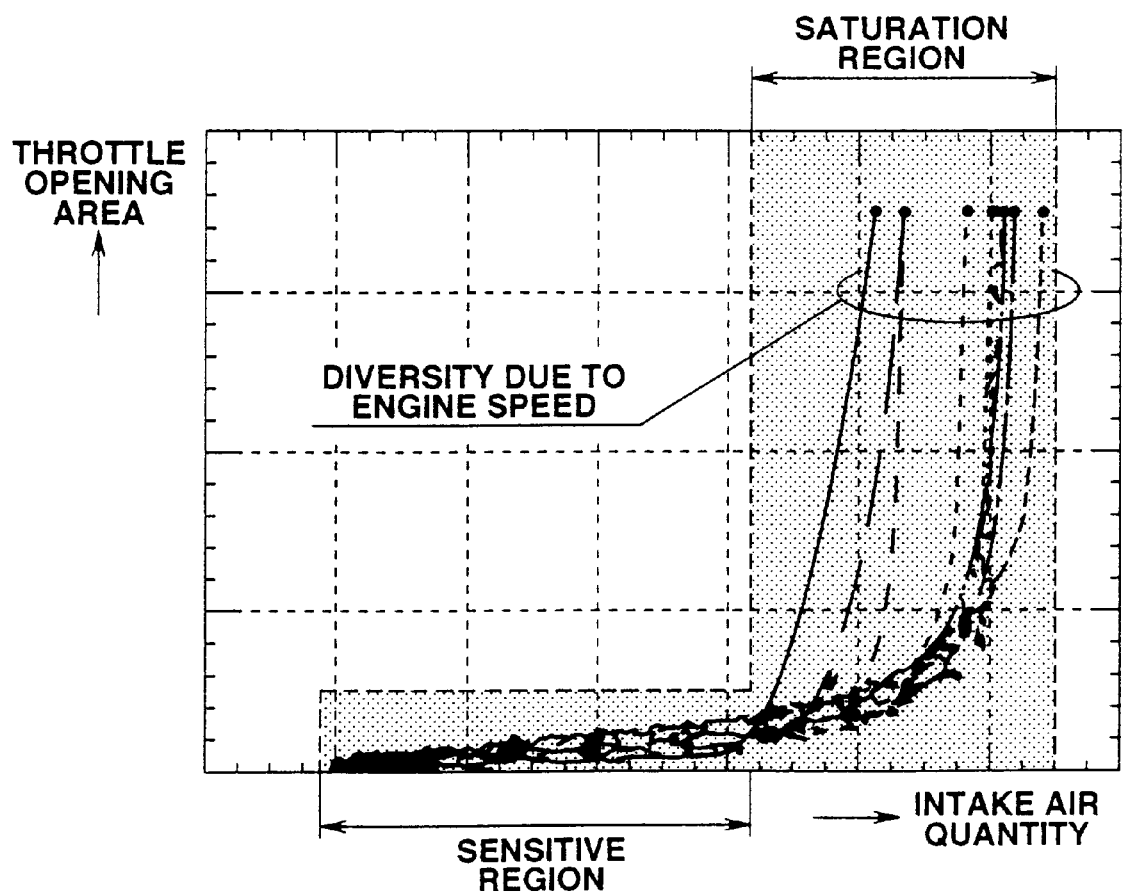
FIG. 15 is a graph showing a relationship between the intake air quantity and the throttle valve opening area.

In FIG. 15, the two parameters are the intake air quantity and the throttle opening area, and the relationship between these parameters is readily influenced by the engine speed. Instead, FIG. 2 employs the volume flow rate ratio as the parameter indicative of the intake air quantity, and the per-unit-displacement throttle opening area for one engine revolution as the parameter indicative of the throttle opening area. By contrast to FIG. 15, the characteristic of FIG. 2 is not affected by variation in the engine speed. Moreover, the characteristic of FIG. 2 is not influenced by types of engines.

Figure 3:
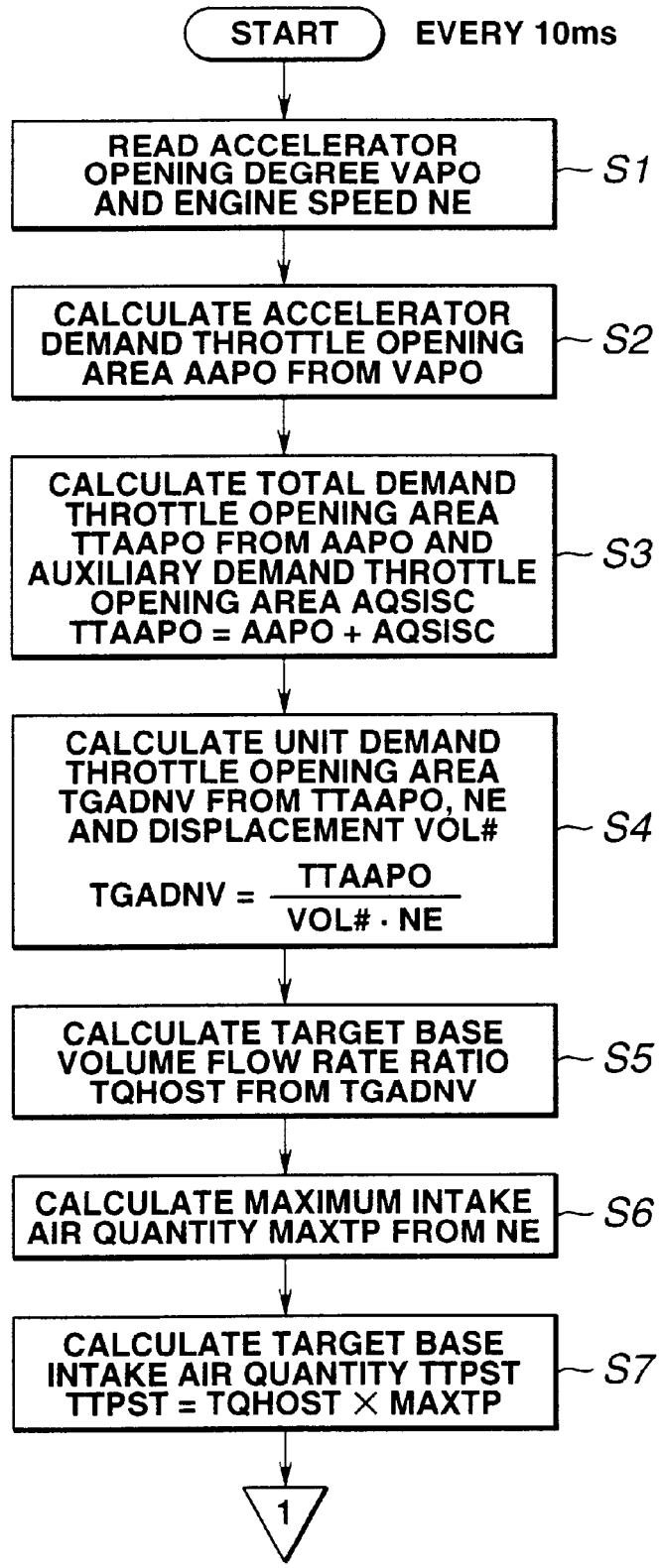
FIGS. 3 and 4 show a flowchart of a procedure for calculating a target throttle opening degree, carried out by the control system of FIG. 1.
Figure 4:
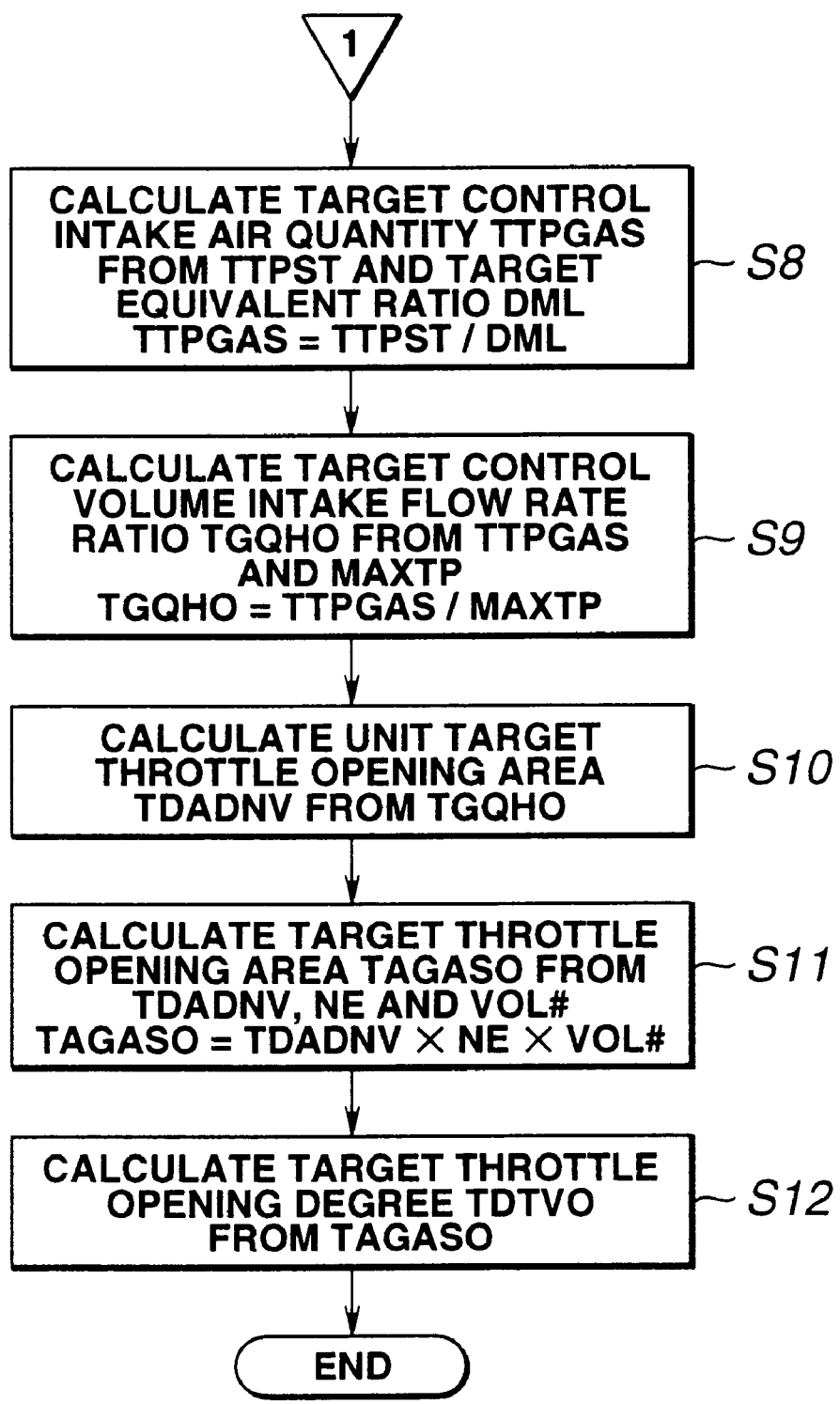

The control unit 11 carries out a throttle control procedure as shown in FIGS. 3 and 4. The flowchart of FIGS. 3 and 4 is performed at regular time intervals (every 10 ms, for example).

At a step S1, the control unit 11 reads an accelerator opening degree VAPO and an engine speed NE.

Figure 5:
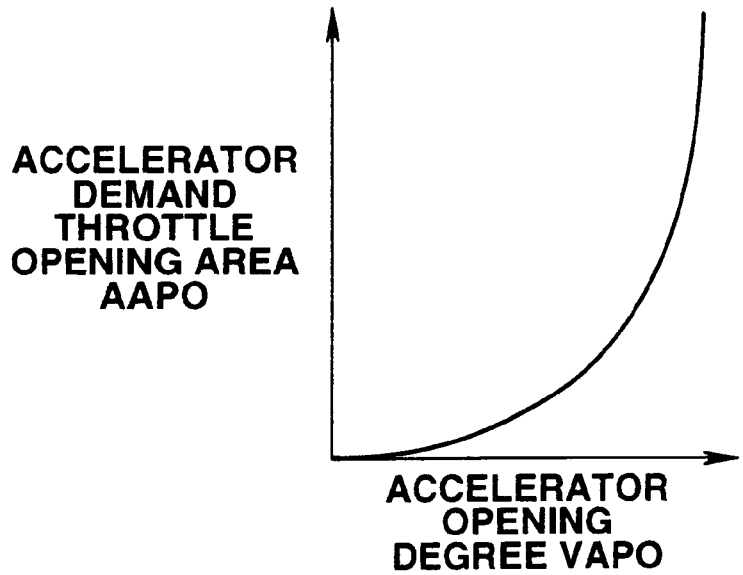
FIG. 5 is a graph showing a relationship between the accelerator opening degree and an accelerator demand throttle opening area, used in a step S2 of FIG. 3.

At a step S2, the control unit 11 determines an accelerator demand opening area AAPO of the throttle valve 6 from the accelerator opening degree VAPO by looking up a table as shown in FIG. 5.

At a step S3, the control unit 11 determines a total demand opening area (or load demand opening area) TTAAPO of the throttle valve 6 by addition of the accelerator demand throttle opening area AAPO and an auxiliary air demand opening area AQSISC.

By adding the auxiliary air demand opening area AQSISC, the control system can increase the idle speed by an amount required by a turn-on of an accessory such as the air conditioning compressor during idle.

In the idle speed control, a required auxiliary air quantity QSISC is preliminarily determined in accordance with operating conditions such as the coolant temperature, an elapsed time from a start of the engine, a battery voltage, a power steering switch, an air conditioner switch, and a gear position in the case of a vehicle equipped with an automatic transmission. The auxiliary air quantity QSISC is translated into the auxiliary air demand throttle opening area AQSISC by using a predetermined table. The control system of FIG. 14 determines a toque indicative quantity by dividing the required auxiliary air quantity QSISC at idle by the then-existing idle speed, and adds the thus-determined torque indicative quantity to the target base torque (as shown in FIG. 14). Therefore, at very low engine speeds, the throttle valve might be opened fully by an excessive increase of the torque indicative quantity. By contrast, the control system of FIG. 1 translates the required auxiliary air quantity QSISC into the required throttle opening area AQSISC and adds this opening area to the accelerator demand opening area AAPO. With this calculation mode using the throttle opening area, the control system of FIG. 1 can maintain the linearity in the characteristic of the throttle valve opening degree with respect to the accelerator opening degree even in the operation of the idle speed control.

At a step S4, the control unit 11 determines a unit demand opening area TGADNV which is a demand opening area per unit displacement per one engine revolution, by dividing the total throttle opening area TTAAPO by a displacement VOL# and the engine speed (rpm) NE.

Figure 7:
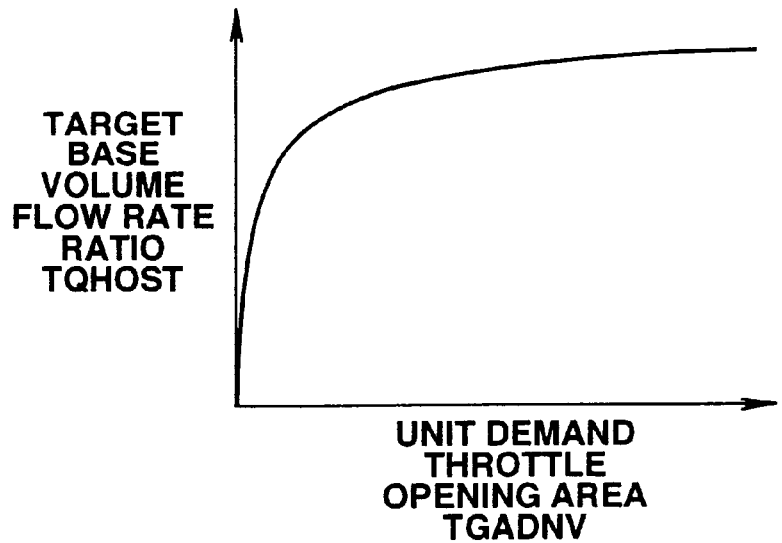
FIG. 7 is a graph showing a relationship between a per-unit-displacement demand throttle opening area and a target base volume flow rate ratio, used in a step S5 of FIG. 3.

At a step S5, the control unit 11 determines a target base volume flow ratio TQHOST (that is, a target volume flow rate ratio at the theoretical air fuel ratio) by looking up a table as shown in FIG. 7. The characteristic shown in FIG. 7 is identical to the characteristic of FIG. 2 (provided that the horizontal and vertical axes are interchanged).

Figure 6:
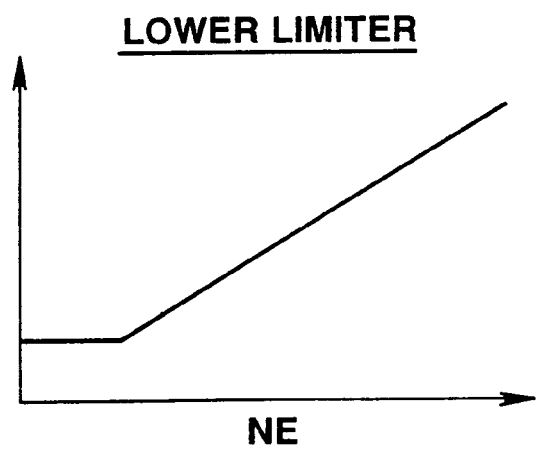
FIG. 6 is a graph showing a characteristic of a lower engine speed limiter used in a step S4 of FIG. 3.

To prevent the denominator from being reduced to zero in the calculation of the step S4, the control unit 11 sets a lower limit on the engine speed NE used at the step S4 by a lower limiter as shown in FIG. 6.

Figure 8:
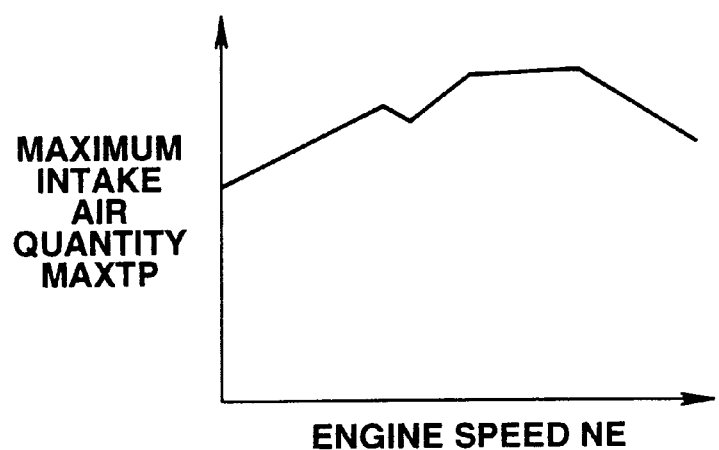
FIG. 8 is a graph showing a relationship between the engine speed and a maximum intake air quantity, used in a step S6 of FIG. 3.

At a step S6, the control unit 11 determines, from the engine speed NE, a maximum intake air quantity MAXTP at the then-existing value of the engine speed NE by looking up a table as shown in FIG. 8.

At a step S7, the control unit 11 determines a target base intake air quantity TTPST by multiplying the target base volume flow ratio TQHOST by the maximum intake air quantity MAXTP. The target base intake air quantity TTPST is a target intake air quantity at the theoretical air fuel ratio. The target base intake air quantity TTPST corresponds to a target torque at the theoretical air fuel ratio.

At a step S8, the control unit 11 determines a target control intake air quantity TTPGAS by dividing the target base intake air quantity TTPST by a target equivalent ratio DML. The target control intake air quantity TTPGAS is a target intake air quantity corresponding to a target air fuel ratio. The target equivalent ratio is basically determined in accordance with the engine speed and the engine load. The target equivalent ratio in this case is equal to a value corresponding to the engine speed at the time of the target base intake air quantity.

The target equivalent ratio DML and the target air fuel ratio are related by DML=[theoretical air fuel ratio]/[target air fuel ratio]. The target equivalent ratio DML is equal to 1.0 in an engine operation at the theoretical air fuel ratio. The target equivalent ratio becomes smaller than 1.0 in the stratified charge combustion mode in which the air fuel ratio exceeds 40, and the lean homogeneous combustion mode in which the air fuel ratio is in a range of 20~23. Thus, the control system increases the intake air quantity beyond the value at the theoretical air fuel ratio when the engine is in the stratified charge combustion mode or in the homogeneous lean combustion mode.

Preferably, the control system takes account of a difference in the combustion efficiency between the combustion at the theoretical air fuel ratio and the combustion in the stratified mode or in the homogeneous lean mode in calculating the target intake air quantity. In this example, the intake air quantity is determined simply by division by the target equivalent ratio for simplification. A U.S. patent application Ser. No. 09/089,367 (filed on Jun. 03, 1998) shows system and process for determining the target intake air quantity in consideration of the combustion efficiency. Pertinent explanations and figures in this U.S. Application are hereby incorporated by reference.

At a step S9, the control unit 11 determines a target volume flow ratio TGQHO by dividing the target control intake air quantity TTPGAS by the maximum intake air quantity MAXTP.

Figure 9:
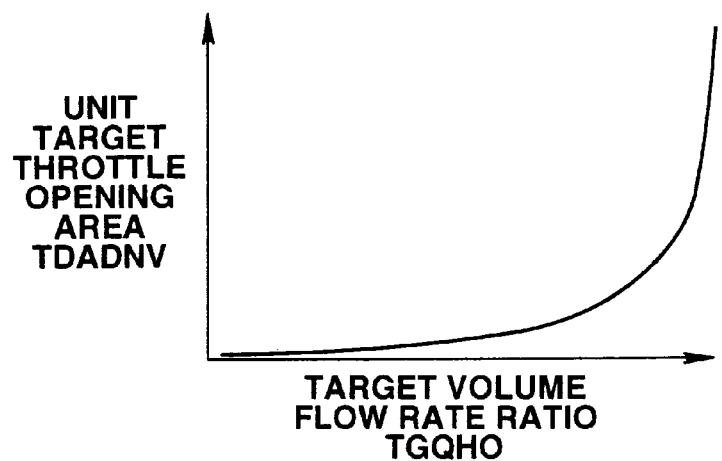
FIG. 9 is a graph showing a relationship between a target volumetric flow rate ratio and a per-unit-displacement target throttle opening area, used in a step S10 of FIG. 4.

At a step S10, the control unit 11 determines, from the target volume flow ratio TGQHO, a unit target throttle opening area TDADNV of the throttle valve 6 which is a target throttle opening area per unit displacement per one engine revolution by looking up a table shown in FIG. 9. The characteristic of FIG. 9 is identical to the characteristic of FIG. 2.

At a step S11, the control unit 11 determines a target throttle opening area TAGASO of the throttle valve 6 by multiplying the unit target throttle opening area TDADNV by the engine speed NE and the displacement VOL#.

Figure 10:
FIG. 10 is a graph showing a relationship between a target throttle opening area and a target throttle opening degree, used in a step S12 of FIG. 4.

At a step S12, the control unit 11 determines, from the target throttle opening area TAGASO, a target throttle opening degree TDTVO by looking up a table as shown in FIG. 10. The thus-calculated target throttle opening degree TDTVO is supplied, as a control variable, to the throttle actuating unit 10, which in turn actuates the throttle valve 6 so as to make the actual throttle opening degree equal to the target throttle opening degree TDTVO.

On the other hand, the control unit 11 calculates the fuel supply quantity in the following manner. From the intake air quantity Qa measured by the air flowmeter 14 and the engine speed NE, the control unit 11 first calculates a base fuel injection pulse width TP according to TP=(Qa/NE)×K (where K is a constant). The base fuel injection pulse width TP gives a fuel quantity required for one revolution. The fuel quantity required for one cycle is twice TP. Then, the control unit 11 calculates a fuel injection pulse width Ti in sequential injection according to the following equation.

$$Ti=TP \times DML \times (\alpha+\alpha m-1) \times 2+Ts$$

where DML is the target equivalent ratio, α is an air fuel ratio feedback correction coefficient, cam is an air fuel ratio learning variable, and Ts is an ineffective pulse width.

The target equivalent ratio DML is basically determined from the engine speed NE and the engine load by a table lookup from a predetermined map. The target equivalent ratio DML is equal to 1.0 at the theoretical air fuel ratio. The target equivalent ratio becomes smaller than 1.0 in the stratified charge combustion mode and the lean homogeneous combustion mode. The control system decreases the fuel supply quantity below the value at the theoretical air fuel ratio when the engine is in the stratified charge combustion mode or in the homogeneous lean combustion mode.

In this embodiment, the table of the relationship between the unit demand throttle opening area TGADNV and the target base volume flow ratio TQHOST shown in FIG. 7 and the table of the relationship between the target volume flow ratio TGQHO and the unit target throttle opening area TDADNV shown in FIG. 9 are both identical to the characteristic of FIG. 2 (provided each of the characteristics of the two tables is in the form of an inverse function of the other). In this embodiment, the tables of FIGS. 7 and 9 are independent from variation of the engine speed, and moreover both tables are substantially identical. This facilitates the preparation and adjustment of the tables, and improves the accuracy of data and the accuracy in the throttle valve control.

Figure 11:
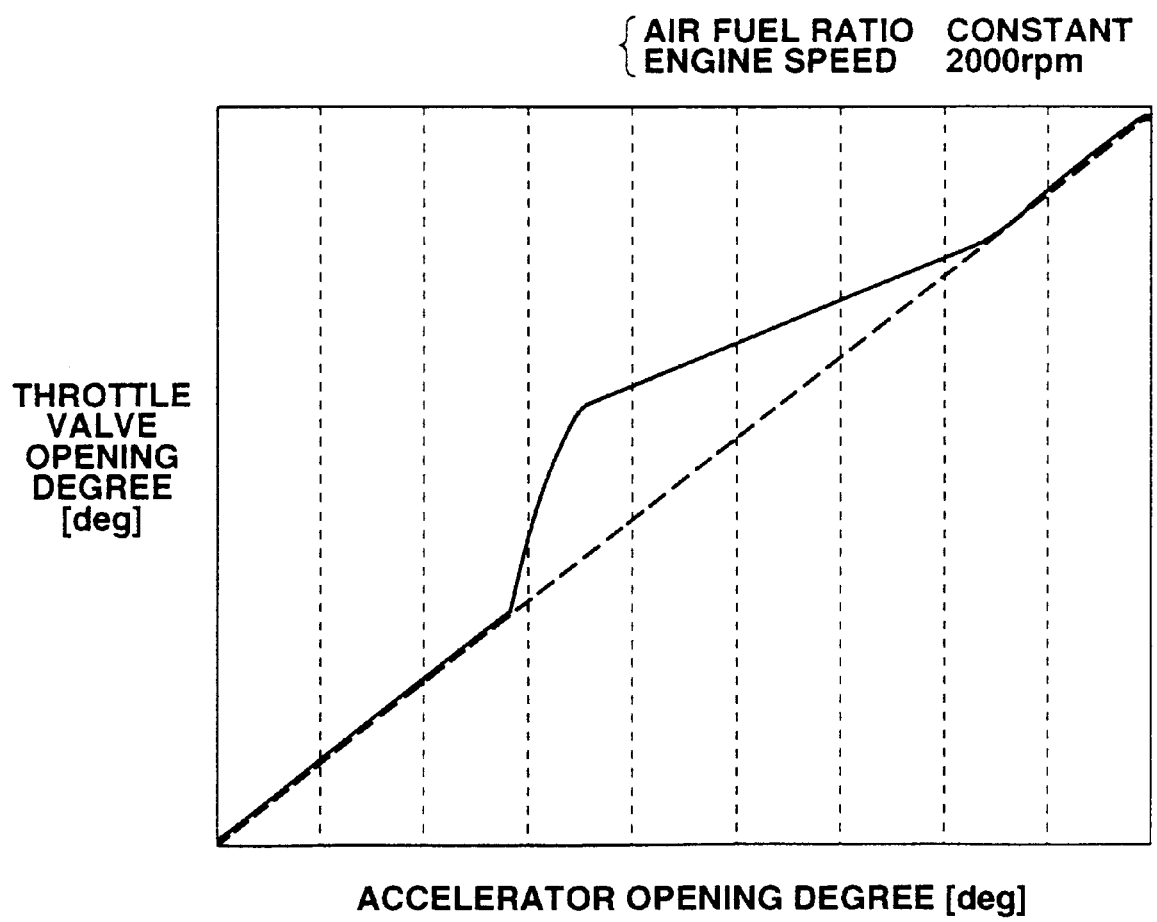
FIG. 11 is a graph for illustrating a characteristic between the accelerator opening degree and the throttle opening degree, provided by the control system according to the embodiment of the present invention.
Figure 12A:
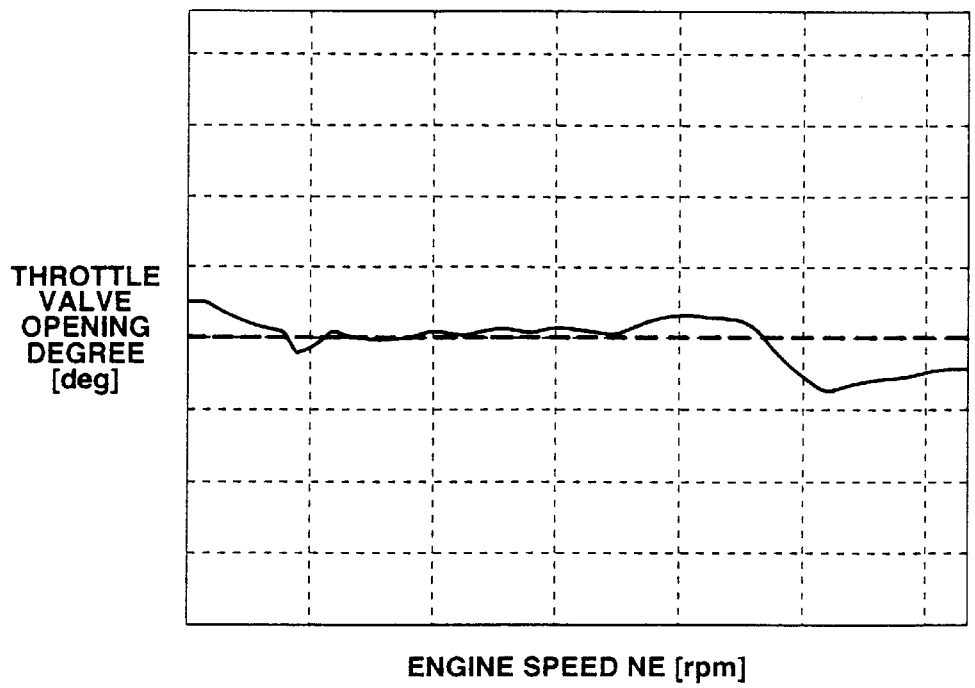
FIGS. 12A and 12B are graphs for illustrating effects obtained by the control system according to the embodiment of the present invention, in a characteristic between the throttle opening degree and the engine speed.
Figure 12B:
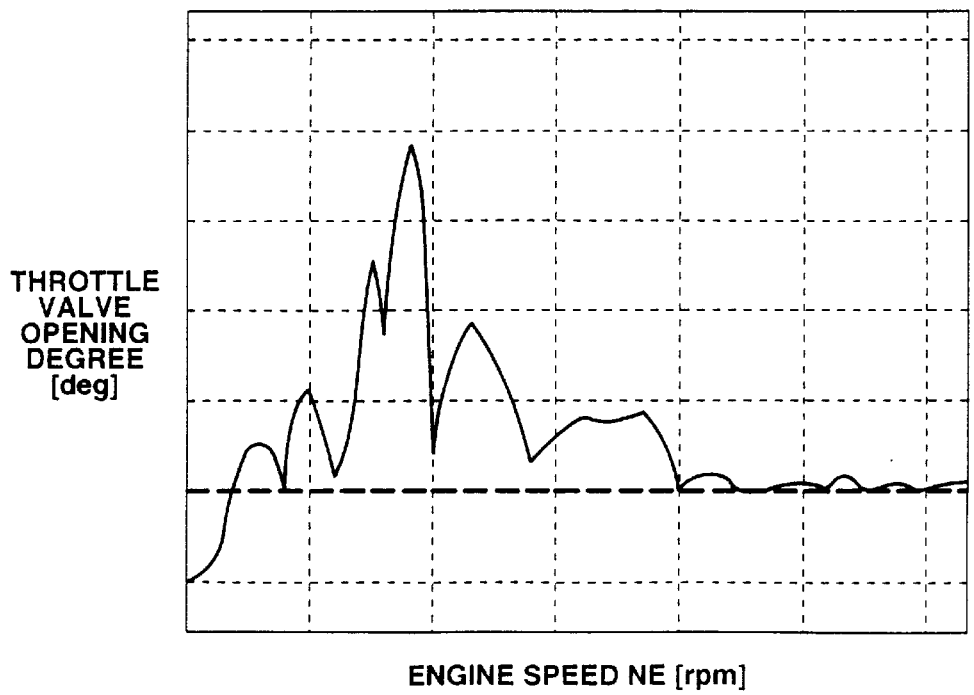
Figure 13:
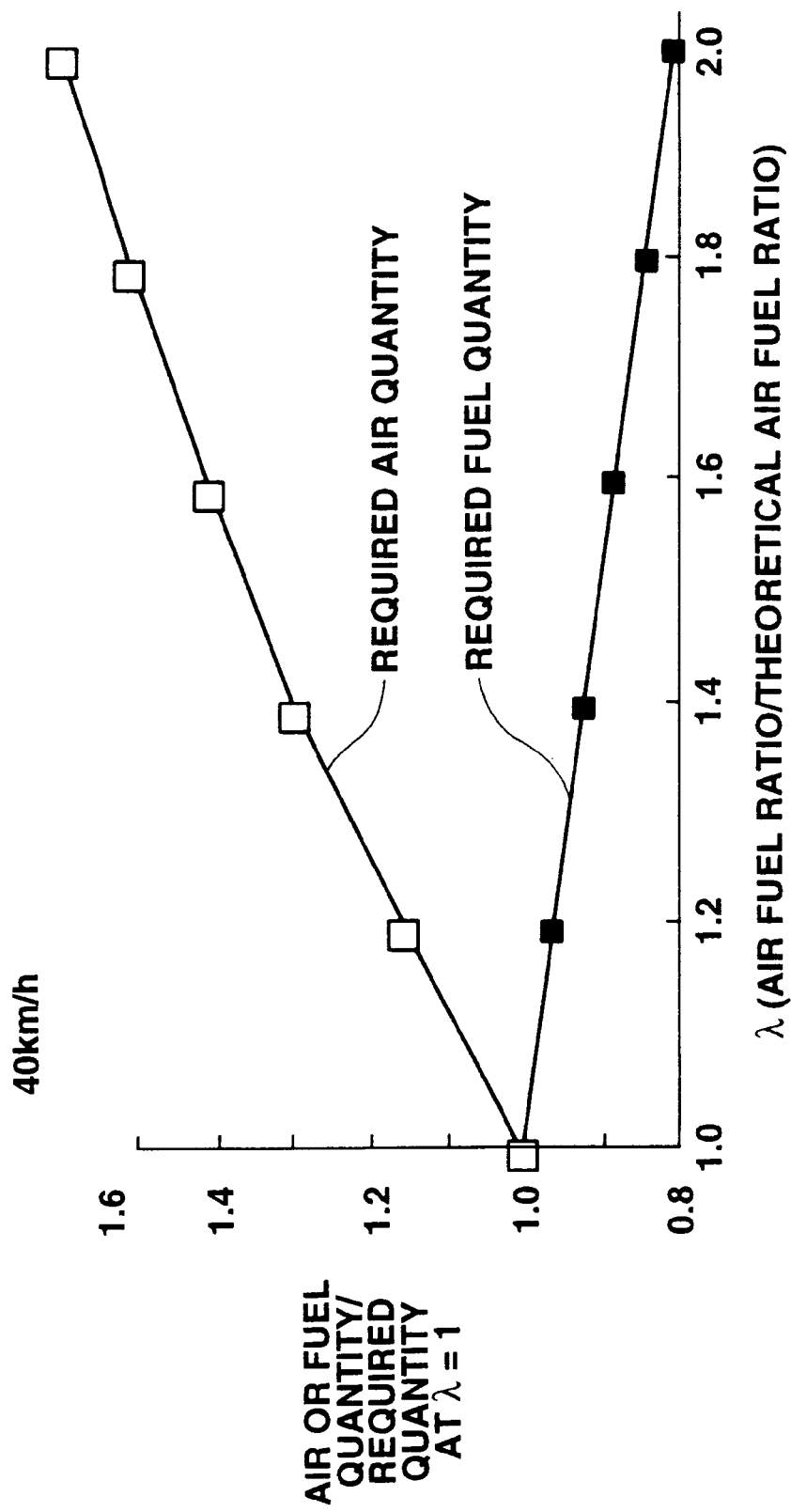
FIG. 13 is a graph showing a relationship between an excess air factor and a required air quantity or a required fuel quantity.

Furthermore, the control system of this embodiment can provide a linear characteristic of the throttle opening degree with respect to the accelerator opening degree under the conditions of constant air fuel ratio and constant engine speed, as shown by a broken line in FIG. 11. Moreover, the control system of the embodiment can hold the throttle valve opening degree substantially constant as shown by broken lines in FIGS. 12A and 12B over the entire region when the engine speed is increased with the air fuel ratio and the accelerator opening degree being held constant.

In the present invention, it is possible to employ an exhaust gas recirculation system. In this case, the control unit 11 determines the target control intake air quantity TTPGAS, at the step S8 of FIG. 4, from the target base intake air quantity TTPST, the target equivalent ratio DML and an EGR gas quantity EGRQ, by using the following equation.

$$TTPGAS=(TTPST+EGRQ)/DML$$

At the step S12, the control unit 11 determines the target throttle opening degree from a difference obtained by subtracting an EGR opening area from the target throttle opening area TAGASO.

In the illustrated example, the base air fuel ratio is equal to the theoretical air fuel ratio. However, it is optional to set the base air fuel ratio at a value not equal to the theoretical ratio.

Figure 16:
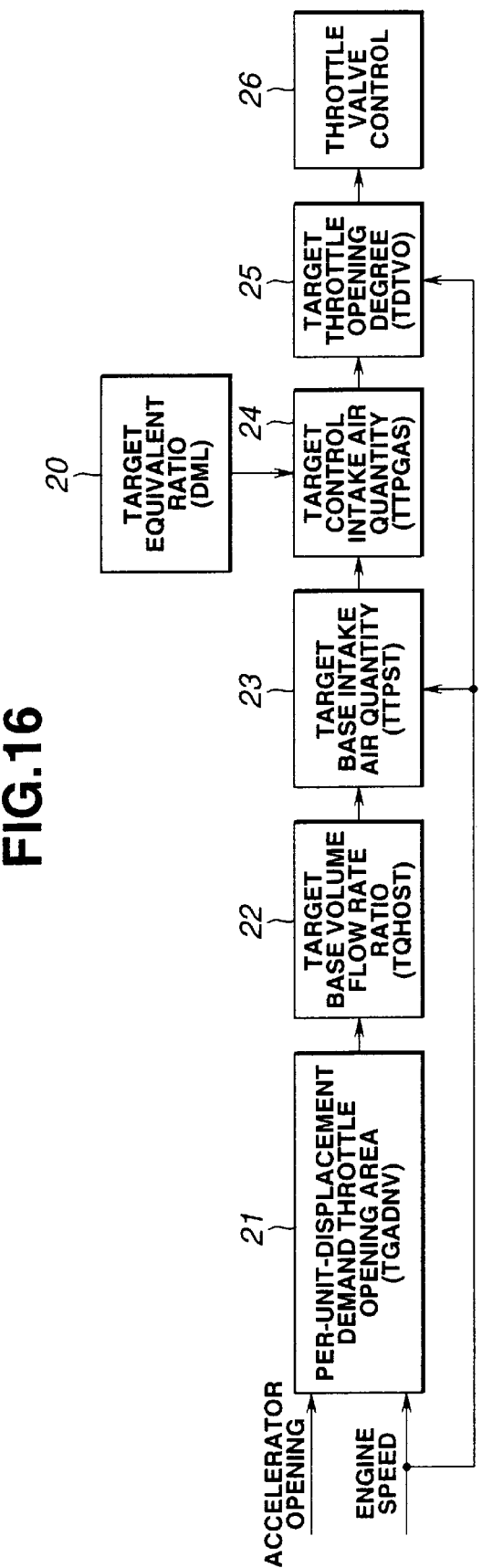
FIG. 16 is a block diagram showing an engine control system according to one aspect of the present invention.

According to one aspect of the present invention, an engine torque control system or apparatus can employ sections as shown in FIG. 16. The system of FIG. 16 comprises: a section 20 for determining a target equivalent ratio (DML); a section 21 for determining a per-unit-displacement demand throttle opening area (or unit demand throttle opening area) (TGADNV) which is a demand throttle opening area per unit displacement for one engine revolution, in accordance with the accelerator opening degree and the engine speed; a section 22 for determining a target base volume flow rate ratio (TQHOST); a section 23 for determining a target base intake air quantity (TTPST); a section 24 for determining a target control intake air quantity (TTPGAS) in accordance with the target base intake air quantity and the target equivalent ratio; a section 25 for determining a desired target throttle opening degree (TDTVO) from the target control intake air quantity and the engine speed in a manner as in the illustrated embodiment or in any other appropriate manner; and a section 26 for controlling the actual throttle opening degree of the throttle valve to the target throttle opening degree.

Figure 17:
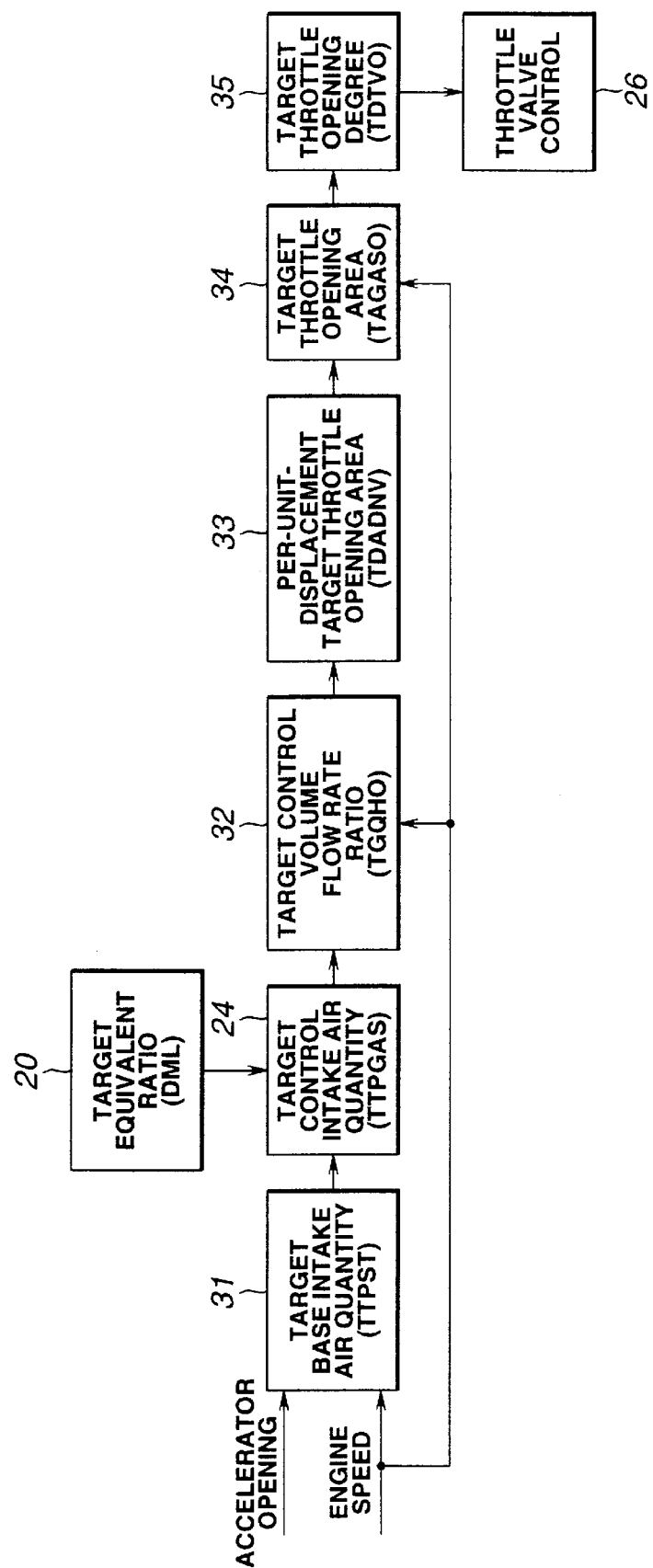
FIG. 17 is a block diagram showing an engine control system according to another aspect of the illustrated embodiment of the present invention.

According to another aspect of the present invention, an engine torque control system or apparatus can employs sections as shown in FIG. 17. The system of FIG. 17 comprises: a second 20 for determining a target equivalent ratio; a second 31 for determining a target base intake air quantity (TTPST) from the accelerator opening degree and the engine speed in a manner as in the illustrated embodiment or in any other appropriate manner; a section 24 for determining a target control intake air quantity (TTPGAS) from the target base intake air quantity and the target equivalent ratio; a section 32 for determining a target control volume flow rate ratio (TGQHO) from the target control intake air quantity; a section 33 for determining a per-unit-displacement (or unit) target throttle opening area (TDADNV) from the target control volume flow rate ratio; a section 34 for determining a target throttle opening area (TAGASO) from the per-unit-displacement target throttle opening area and the engine speed; a section 35 for determining a target throttle opening degree (TDTVO) from the target throttle opening area; and a section 26 for producing a throttle valve control signal representing the target throttle opening degree.

Figure 18:
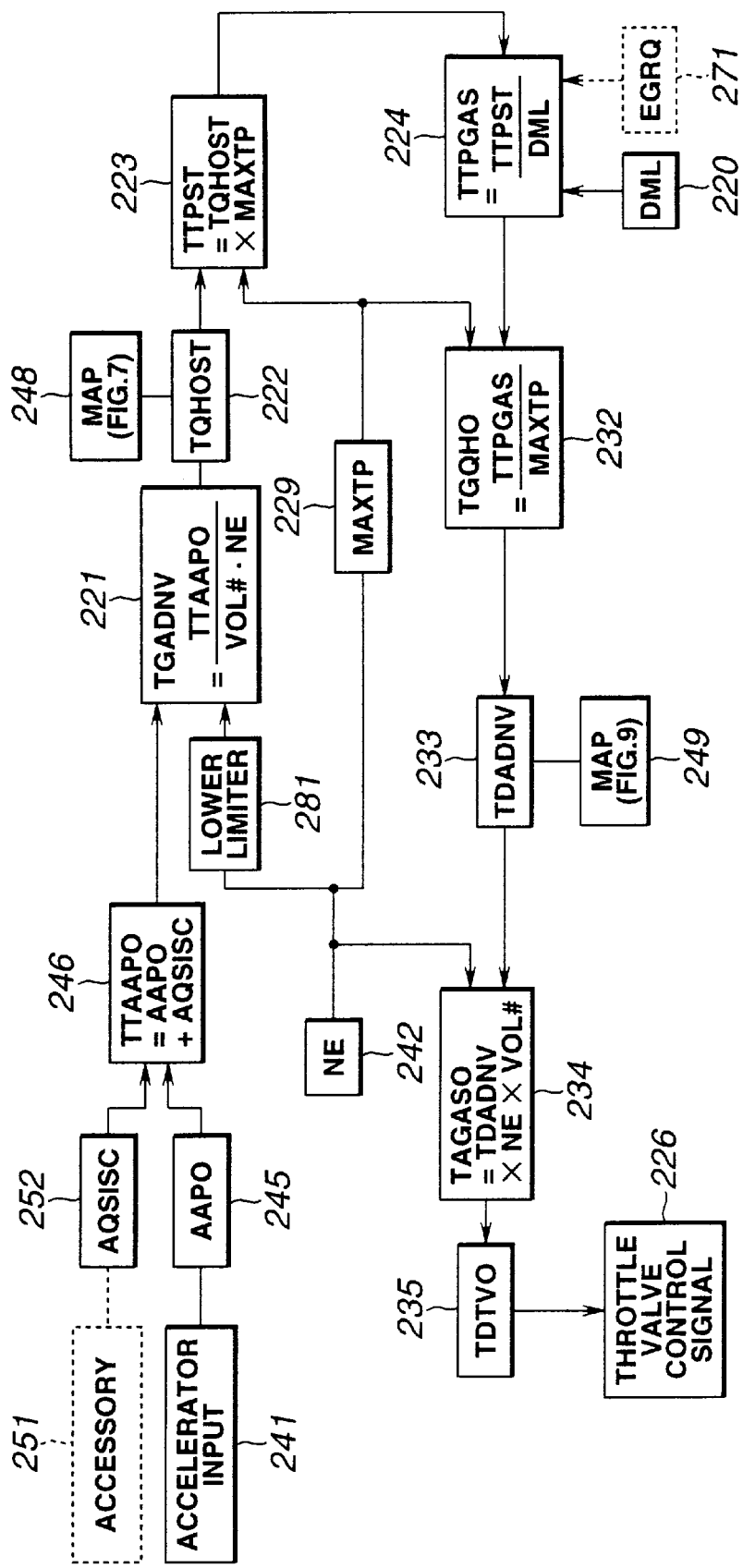
FIG. 18 is a block diagram showing an arrangement of various sections of the engine control system according to the illustrated embodiment of the present invention.

The illustrated embodiment combines both aspects of the invention as shown in FIG. 18. In the engine torque control system or apparatus of FIG. 18, sections 245, 246, 221, 222, 229, 223, 224, 232, 233, 234 and 235 correspond, respectively, to the steps S2~S12. The section 222 uses a map 248 of a functional relationship such as the relationship shown in FIG. 7. The section 233 uses a map 249 of a functional relationship such as one shown in FIG. 9. Sections 220 and 226 correspond, respectively, to the sections 20 and 26 shown in FIGS. 16 and 17. A section 241 produces a signal representing a driver's accelerator input such as the accelerator opening degree. The section 241 may comprise the accelerator pedal 16 and the accelerator sensor 12, or may comprise an input device operated by the driver. A section 242 produces an engine speed signal representing the sensed engine speed NE. A section 281 sets a lower limit to the engine speed NE supplied to the section 221. A section 252 determines an auxiliary demand throttle opening area (AQSISC). For example, the auxiliary demand throttle opening area is determined in accordance with a condition of an accessory 251 such as an air conditioning compressor. The system may further comprise a section 271 for determining an EGR quantity (EGRQ).

Figure 19:
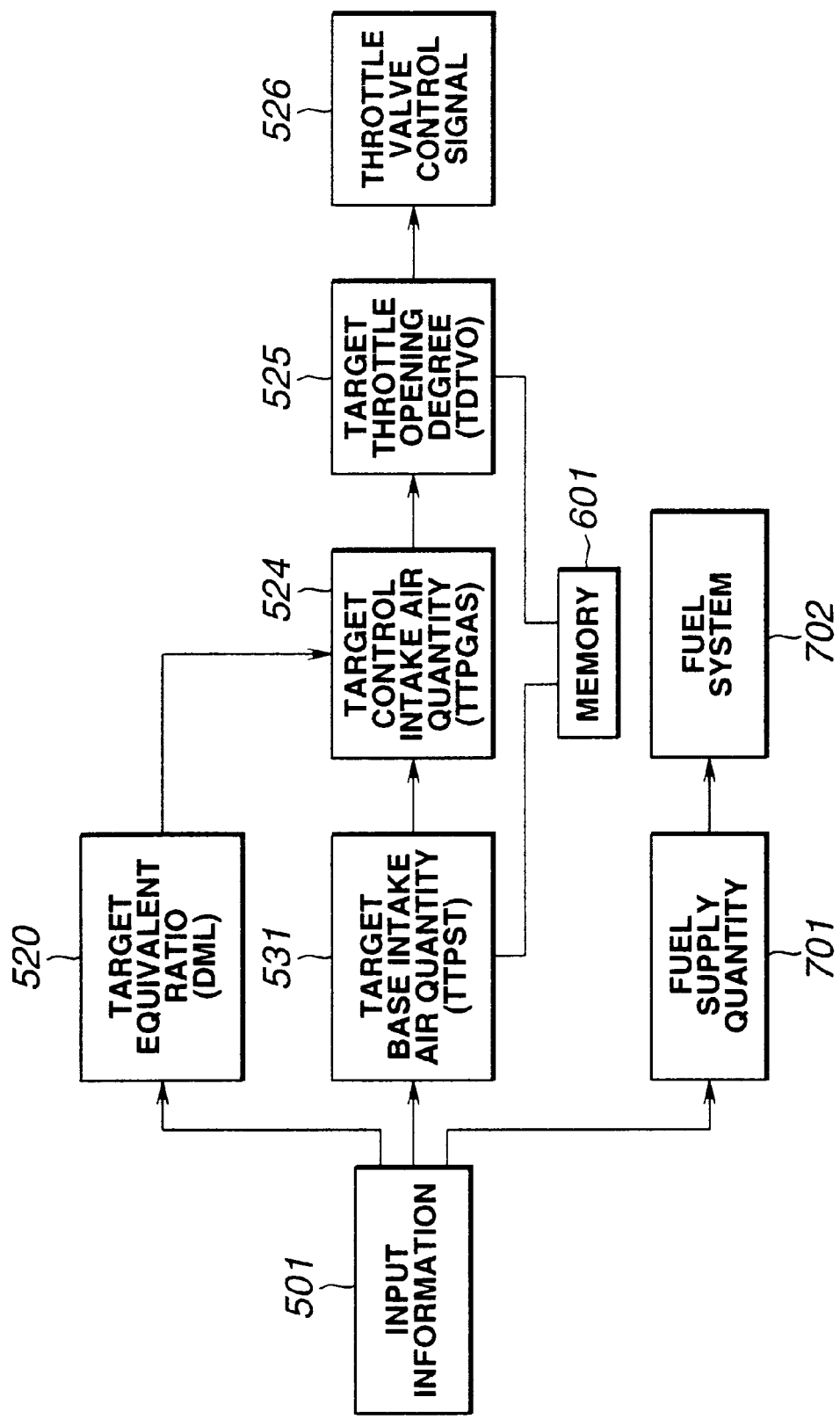
FIG. 19 is a block diagram showing a combination of an intake air control system and a fuel control system according to the illustrated embodiment of the present invention.

According to the present invention, an engine torque control system or apparatus may further comprise a fuel supply quantity control system. FIG. 19 shows one example.

In a torque control system or apparatus of FIG. 19, sections 520, 531, 524, 525 and 526 correspond, respectively, to the section 20, 31, 24, 25 and 26. An input section 501 collects input information on engine operating conditions inclusive of the driver's command for acceleration and the engine speed, needed for the engine torque control. A section 701 calculates a desired target fuel supply quantity (or fuel injection quantity). For example, the target fuel supply quantity is determined in accordance with the engine speed NE, the intake air flow rate sensed by the air flow meter 14 and the target equivalent ratio (DML) of the section 520. A fuel system 702, such as a fuel injection system, supplies the controlled amount of the fuel to the engine in response to a fuel control signal from the section 701. The U.S. patent applications Ser. Nos. 08/804,454 (filed Feb. 21, 1997) and 09/089,367 (filed Jun. 3, 1998) show fuel control systems which can be employed in the present invention. Explanations in these U.S. Applications are hereby incorporated by reference.

The system of FIG. 19 further comprise a memory section 601 for storing a functional relationship corresponding to FIG. 2 in a form such as a map.

In the illustrated example, the control system of FIG. 1 is mounted on a vehicle. The control unit 11 includes, as a main component, at least one computer mounted on the vehicle.

This application is based on a Japanese Patent Application No. 9(1997)-348042. The contents of the Japanese Patent Application No. 9(1997)-348042 with a filing date of Dec. 17, 1997 are hereby incorporated by reference.

What is claimed is:

1. A torque controllable engine comprising:
   a throttle valve;
   an accelerator sensor for sensing an accelerator opening degree of an accelerator pedal;
   an engine speed sensor for sensing an engine speed of the engine; and
   a controller comprising;
   i) a first section for calculating a target equivalent ratio,
   ii) a second section for calculating a unit demand throttle opening area which is a demand throttle opening area per unit displacement for one engine revolution, in accordance with the accelerator opening degree and the engine speed,
   iii) a third section for calculating a target base intake air quantity in accordance with the unit demand throttle opening area,
   iv) a fourth section for calculating a target control intake air quantity in accordance with the target base intake air quantity and the target equivalent ratio,
   v) a fifth section for calculating a desired target throttle opening degree in accordance with the target control intake air quantity and the engine speed, and
   vi) a sixth section for controlling an actual throttle opening degree of the throttle valve to the target throttle opening degree.

2. The engine as claimed in claim 1 wherein the third section of the controller comprises:
   a first subsection for calculating a target base volume flow rate ratio from the unit demand throttle opening area; and
   a second subsection for calculating the target base intake air quantity by multiplying the target base volume flow rate ratio by a maximum intake air quantity at the engine speed.

3. The engine as claimed in claim 2 wherein the fifth section comprises:
   a first subsection for calculating a target control volume flow rate ratio by dividing the target control intake air quantity by the maximum intake air quantity at the engine speed;
   a second subsection for calculating a unit target throttle opening area which is a target throttle opening area per unit displacement for one engine revolution, from the target control volume flow rate ratio;
   a third subsection for calculating a target throttle opening area by multiplying the unit target throttle opening area by a displacement and the engine speed; and
   a fourth subsection for calculating the desired target throttle opening degree from the target throttle opening area.

4. The engine as claimed in claim 3 wherein the second section comprises:
   a first subsection for calculating a load demand throttle opening area in accordance with the accelerator opening degree; and
   a second subsection for calculating the unit demand throttle opening area by dividing the load demand throttle opening area by the displacement and the engine speed.

5. The engine as claimed in claim 4 wherein the first subsection of the second section calculates the load demand throttle opening area by adding an auxiliary demand throttle opening area for an idle speed control, to an accelerator demand throttle opening area determined in accordance with the accelerator opening.

6. The engine as claimed in claim 1 wherein the fifth section comprises:
   a first subsection for calculating a target control volume flow rate ratio by dividing the target control intake air quantity by a maximum intake air quantity at the engine speed;
   a second subsection for calculating a unit target throttle opening area which is a target throttle opening area per unit displacement for one engine revolution, from the target control volume flow rate ratio;
   a third subsection for calculating a target throttle opening area by multiplying the unit target throttle opening area by a displacement and the engine speed; and
   a fourth subsection for calculating the desired target throttle opening degree from the target throttle opening area.

7. The engine as claimed in claim 1 wherein the second section comprises:
   a first subsection for calculating a load demand throttle opening area in accordance with the accelerator opening degree; and
   a second subsection for calculating the unit demand throttle opening area by dividing the load demand throttle opening area by a displacement and the engine speed.

8. An apparatus for controlling engine torque, the apparatus comprising:
   a processing section for calculating a target base intake air quantity in accordance with an accelerator input and an engine speed, for calculating a target control intake air quantity in accordance with the target base intake air quantity and a target equivalent ratio, for calculating a desired target throttle opening degree in accordance with the target control intake air quantity and the engine speed, and for controlling an actual throttle opening degree to control the engine torque in accordance with the target throttle opening degree; and a storing section for storing a functional relationship between a unit throttle opening area and a volumetric intake flow rate ratio, and for causing the processing section to use the functional relationship for calculation of the target throttle opening degree from the accelerator input and the engine speed, the unit throttle opening area being a throttle opening area per unit displacement for one engine revolution.

9. The apparatus as claimed in claim 8 wherein the processing section calculates one of the target base intake air quantity and the target throttle opening degree by using the functional relationship stored in the storing section, the unit throttle opening area is equal to a quotient obtained by dividing a whole throttle opening area by a volumetric displacement and the engine speed, and the volumetric intake flow rate ratio is equal to a quotient obtained by dividing an intake air quantity by a maximum intake air quantity at the engine speed.

10. The apparatus as claimed in claim 9 wherein the processing section comprises a maximum intake quantity determining section for determining the maximum intake air quantity in accordance with the engine speed, a first translating section for determining one of the whole throttle opening area and the unit throttle opening area from the other of the whole throttle opening area and the unit throttle opening area so that the unit throttle opening area equals the quotient obtained by dividing the whole throttle opening area by the displacement and the engine speed, a second translating section for determining one of the volumetric intake flow rate ratio and a corresponding intake air quantity so that the volumetric intake flow rate ratio equals the quotient obtained by dividing the corresponding intake air quantity by the maximum intake air quantity, and a function determining section for determining one of the unit throttle opening area and the volumetric intake flow rate ratio from the other of the unit throttle opening area and the volumetric intake flow rate ratio according to the functional relationship.

11. The apparatus as claimed in claim 10
wherein the apparatus comprises a controller which comprises the processing section and the storing section;
wherein the processing section comprises:
a target equivalent ratio determining section for calculating the target equivalent ratio,
a target base intake air quantity determining section for calculating the target base intake air quantity in accordance with the accelerator input and the engine speed;
a target control intake air quantity determining section for calculating the target control intake air quantity in accordance with the target base intake air quantity and the target equivalent ratio so that the target control intake air quantity equals the target base intake air quantity divided by the target equivalent ratio;
a target throttle opening degree determining section for calculating the target throttle opening degree in accordance with the target control intake air quantity and the engine speed; and
a throttle controlling section for controlling the actual throttle opening degree to the target throttle opening degree; and
wherein one of the target base intake air quantity determining section and the target throttle opening degree determining section comprises the first and second translating sections and the function determining section.

12. The apparatus as claimed in claim 11 wherein the target throttle opening degree determining section comprises the second translating section for determining the volumetric intake flow rate ratio which is a target control volume flow rate ratio from the corresponding intake air quantity which is the target control intake air quantity, the function determining section for determining the unit throttle opening area which is a unit target throttle opening area from the target control volume intake flow rate ratio according to the functional relationship, and the first translating section for determining the whole throttle opening area which is the desired target throttle opening area from the unit target throttle opening area.

13. The apparatus as claimed in claim 11 wherein the target base intake air quantity determining section comprises the first translating section for determining the unit throttle opening area which is a unit demand throttle opening area from the whole throttle opening area which is a load demand throttle opening area by dividing the load demand throttle opening area by the engine speed and a volumetric displacement, the function determining section for determining the volumetric intake flow rate ratio which a target base volume flow rate ratio from the unit demand throttle opening area according to the functional relationship, and the second translating section for determining the corresponding intake air quantity which is the target base intake air quantity from the target base volume flow rate ratio.

14. The apparatus as claimed in claim 13 wherein the target throttle opening degree determining section comprises a third translating section for determining a target control volume flow rate ratio from the target control intake air quantity by dividing the target control intake air quantity by the maximum intake air quantity, a second function determining section for determining the unit target throttle opening area from the target control volume intake flow rate ratio according to an inverse function of the functional relationship, and a fourth translating section for determining the target throttle opening area from the unit target throttle opening area by multiplying the unit target throttle opening area by the displacement and the engine speed.

15. The apparatus as claimed in claim 13 wherein the target base intake air quantity determining section comprises a lower limiting section for preventing the engine speed used in the first translating section from being reduced to zero.

16. The apparatus as claimed in claim 13 wherein the target base intake air quantity determining section comprises an accelerator demand determining section for determining an accelerator demand throttle opening area, an auxiliary demand determining section for determining an auxiliary demand throttle opening area in accordance with a condition of an accessory during engine idling, and a load demand determining section for determining the load demand throttle opening area by addition of the accelerator demand throttle opening area and the auxiliary demand throttle opening area.

17. The apparatus as claimed in claim 11 wherein the apparatus is an engine system and further comprises an internal combustion engine, a throttle valve, a throttle actuator for receiving a throttle control signal produced by the throttle controlling section and for varying the actual throttle opening degree of the throttle valve in response to the throttle control signal representing the target throttle opening degree, and an input section for collecting input information for determining the accelerator input and the engine speed.

18. The apparatus as claimed in claim 17 wherein the input section comprises an accelerator input device producing an accelerator input signal representing the accelerator input, an engine speed sensor for determining the engine speed, and an air flow sensor for sensing an actual intake air quantity, and the apparatus further comprises a fuel system for varying a fuel supply quantity to the engine in response to a fuel control signal, and a fuel control section for controlling the fuel supply quantity by producing the fuel control signal in accordance with the engine speed, the actual intake air quantity and the target equivalent ratio.

19. An engine torque controlling process comprising:
- a first step for calculating a target base intake air quantity in accordance with an accelerator input and an engine speed;
- a second step for calculating a target control intake air quantity in accordance with the target base intake air quantity and a target equivalent ratio; and
- a third step for calculating a desired target throttle opening degree in accordance with the target control intake air quantity and the engine speed and for controlling an actual throttle opening degree to control the engine torque in accordance with the target throttle opening degree;
- wherein a functional relationship between a unit throttle opening area and a volumetric intake flow rate ratio is used for calculation of the target throttle opening degree from the accelerator input and the engine speed, and the unit throttle opening area is a throttle opening area per unit displacement for one engine revolution.

20. The process as claimed in claim 19 wherein the functional relationship is used for calculating one of the target base intake air quantity and the target throttle opening degree, the unit throttle opening area is equal to a quotient obtained by dividing a whole throttle opening area by a displacement and the engine speed, and the volumetric intake flow rate ratio is equal to a quotient obtained by dividing an intake air quantity by a maximum intake air quantity at the engine speed.

21. The engine torque controlling process as claimed in claim 19 wherein the process further comprises a target equivalent ratio determining step of calculating the target equivalent ratio; wherein the first step comprises a first sub-step for calculating a unit demand throttle opening area which is a demand throttle opening area per unit displacement for one engine revolution, in accordance with the accelerator input and the engine speed, and a second sub-step for calculating the target base intake air quantity in accordance with the unit demand throttle opening area; and wherein the third step comprises a target throttle opening determining step for calculating the target throttle opening degree in accordance with the target control intake air quantity and the engine speed, and a throttle controlling step for controlling the actual throttle opening degree to the target throttle opening degree.

22. The engine torque controlling process as claimed in claim 19:
- wherein the process further comprises a target equivalent ratio determining step of calculating the target equivalent ratio;
- wherein the first step comprises a first translating step for determining a unit demand throttle opening area from a load demand throttle opening area by diving the load demand throttle opening area by the engine speed and a displacement, a first function determining step for determining a target base volume flow rate ratio from the unit demand throttle opening area according to the functional relationship, and a second translating section for determining the target base intake air quantity from the target base volume flow rate ratio; and
- wherein the third step comprises a third translating step for determining a target control volume flow rate ratio from the target control intake air quantity by dividing the target control intake air quantity by the maximum intake air quantity, a second function determining step for determining a unit target throttle opening area from the target control volume intake flow rate ratio according to an inverse function of the functional relationship, a fourth translating step for determining a target throttle opening area from the unit target throttle opening area by multiplying the unit target throttle opening area by the displacement and the engine speed and a target throttle opening determining step for determining the desired target throttle opening degree from the target throttle opening area.

* * * * *